A. H. WALLACE.

PHOTOGRAPHIC PRINTING MACHINE.

APPLICATION FILED MAR. 8, 1915.

Reissued Apr. 18, 1916.

14,114.

3 SHEETS—SHEET 1.

WITNESSES

J. D. Hamilton

Lawrence V. Head

INVENTOR

ANDREW H. WALLACE by Fetherstonhaugh & Co attys

A. H. WALLACE.
PHOTOGRAPHIC PRINTING MACHINE.
APPLICATION FILED MAR. 8, 1915.
Reissued Apr. 18, 1916.
14,114.
3 SHEETS—SHEET 2.
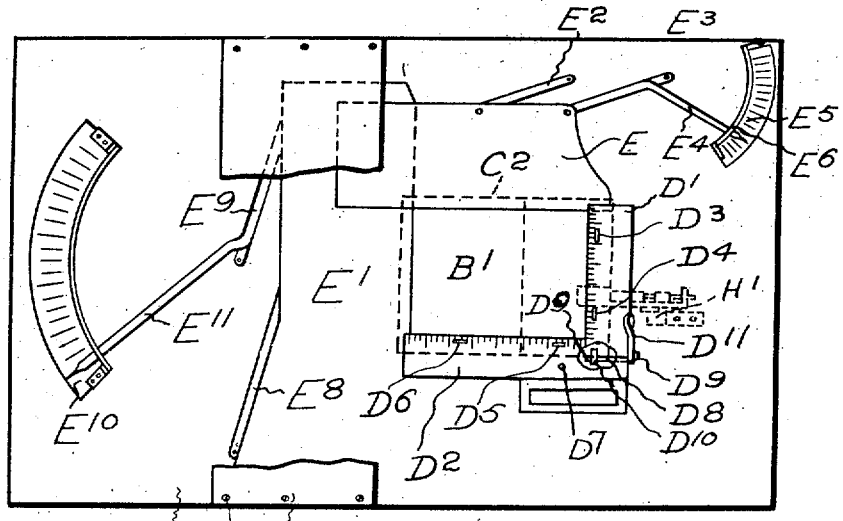
FIG. 3.
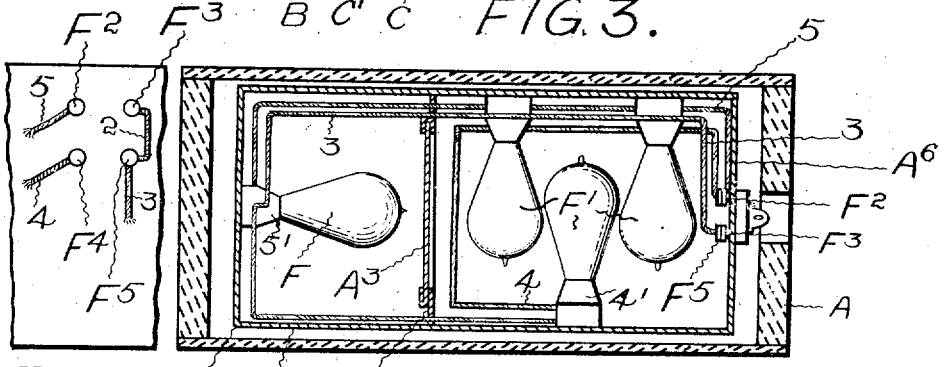
FIG. 8.
FIG. 4.
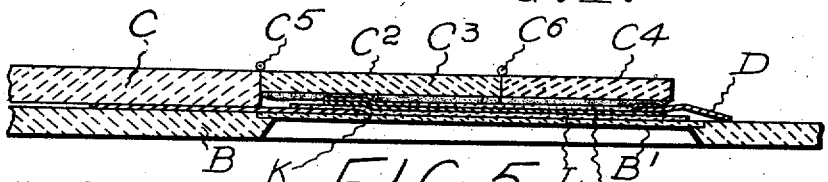
FIG. 5.
WITNESSES
J. D. Hamilton
Lawrence V. Head
INVENTOR
ANDREW H. WALLACE
by Fetherstonhaugh & Co
attys

A. H. WALLACE.

PHOTOGRAPHIC PRINTING MACHINE.

APPLICATION FILED MAR. 8, 1915.

Reissued Apr. 18, 1916.

14,114.

3 SHEETS—SHEET 3.

WITNESSES

J. D. Hamilton

Lawrence V. Head

INVENTOR

ANDREW. H. WALLACE by Fetherstonhaugh & Co attys.

UNITED STATES PATENT OFFICE.

ANDREW HARMON WALLACE, OF ST. CATHARINES, ONTARIO, CANADA.

PHOTOGRAPHIC-PRINTING MACHINE.

14,114. Specification of Reissued Letters Patent. Reissued Apr. 18, 1916.

Original No. 1,103,330, dated July 14, 1914. Serial No. 708,286. Application for reissue filed March 8, 1915. Serial No. 13,034.

*To all whom it may concern:*

Be it known that I, ANDREW HARMON WALLACE, of the city of St. Catharines, in the county of Lincoln, in the Province of Ontario, Canada, have invented certain new and useful Improvements in Photographic-Printing Machines, of which the following is the specification.

My invention relates to improvements in photographic printing masks, and the object of the invention is to devise a mask which may be set so as to print the standard white margin around the edge of a photographic print of any size, in which the colored light employed while setting the mask is automatically turned off by the closing of the apparatus and the printing or white lights are simultaneously turned on and it consists essentially of a closed casing having a dividing partition intermediate of the length thereof provided with a suitable transparent colored window, incandescent bulbs suitably supported in each of the compartments formed by the aforesaid partition, a transparent window formed in the top of the casing over one of the compartments, a stationary inner right angular mask member extending around two sides of the window, adjustable mask members extending around the remaining sides of the window, and means for adjusting and setting the movable mask members inwardly or outwardly as desired, a covering shutter extending over the mask members, and means operated by the closing of the shutter for turning out the light in one compartment and turning on the light in the compartment having the window in the top thereof as hereinafter more particularly explained by the following specification.

Figure 1:
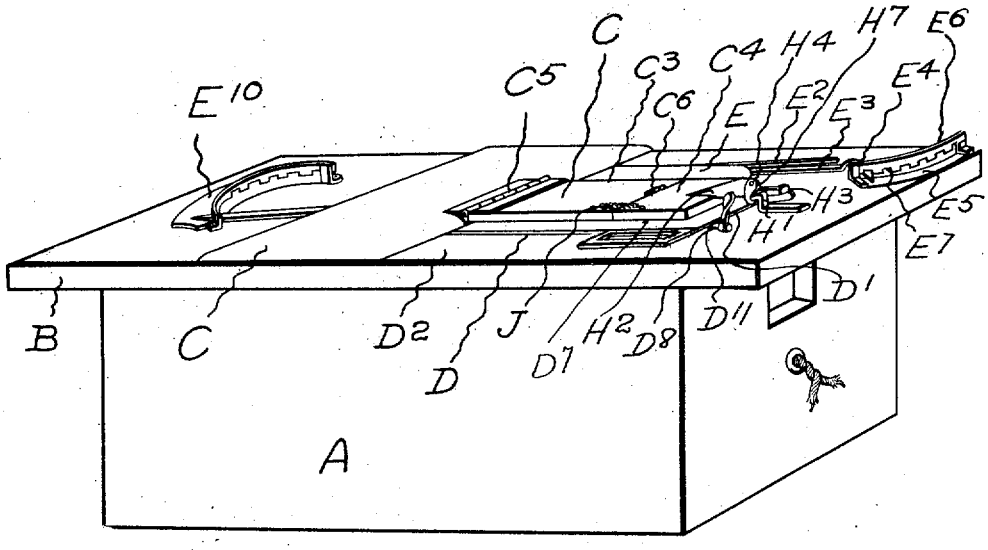
Figure 2:
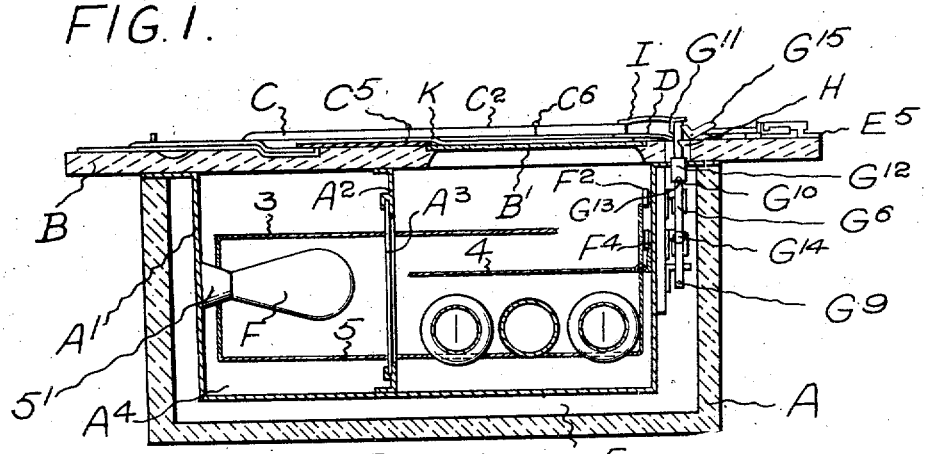
Figure 6:
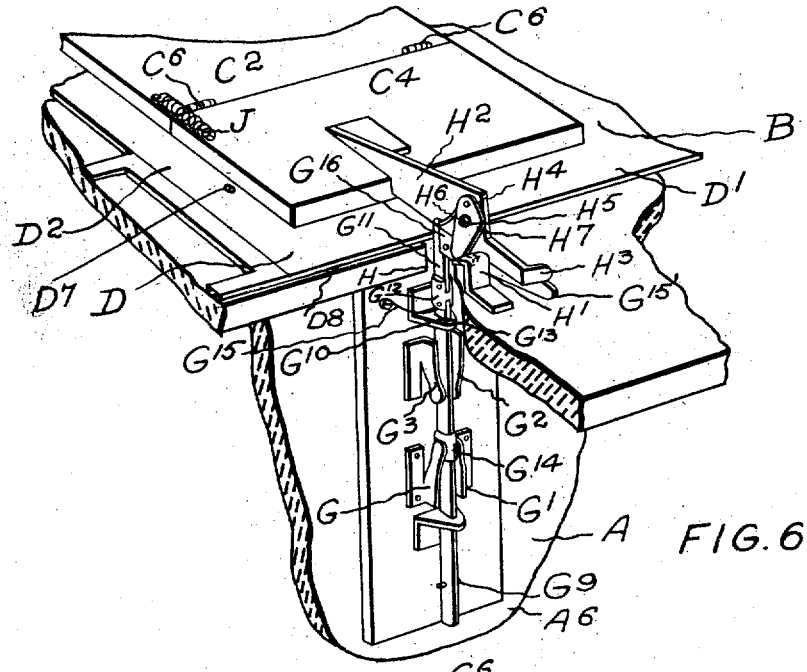
Figure 7:
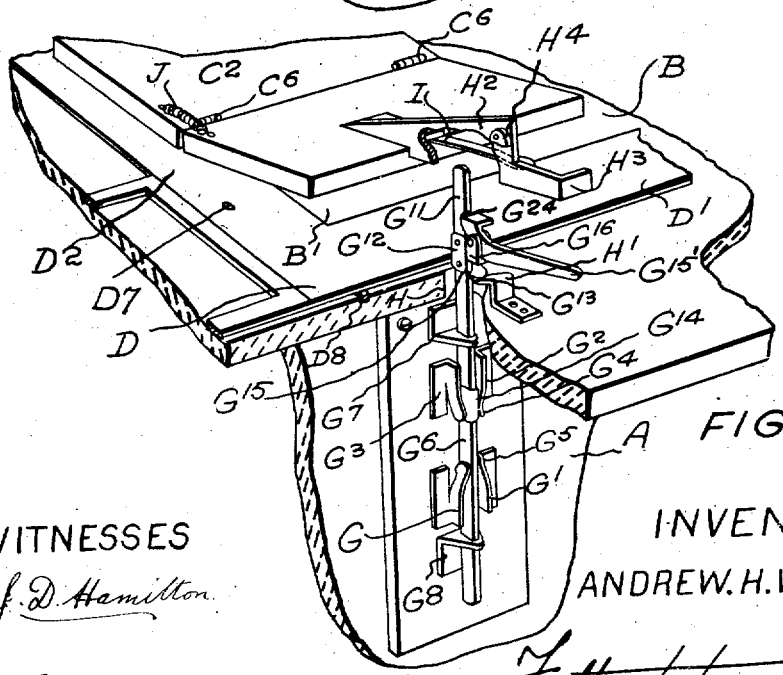

Figure 1. is a general perspective view of my device. Fig. 2. is a longitudinal section through my device. Fig. 3. is a plan view of my device showing the closing shutter in dotted lines. Fig. 4. is a sectional plan view. Fig. 5. is an enlarged longitudinal section through a portion of the top of my device showing the closing shutter, printing window, photographic film or negative, and printing paper in position. Fig. 6. is a perspective detail of my electric switch and shutter operating mechanism. Fig. 7. is a similar view to Fig. 6. showing the shutter open and the switch in the position it assumes when the shutter is open. Fig. 8 is a detail of the binding printing post connections of the switch.

In the drawings like letters of reference indicate corresponding parts in each figure.

A is the main casing of my device in which is supported a supplemental casing A′.

$A^2$ is a partition which divides the casing A into two compartments $A^4$ and $A^5$.

B is the casing cover or table. The partition $A^2$ extending crosswise in the casing A′ is provided with a window of transparent material $A^3$ of the ruby or a suitable color.

B′ is a window formed in the cover. The window B′ is located over the compartment $A^5$.

C is a cross piece secured to the top of the cover B by screws C′.

$C^2$ is a printing frame shutter comprising the portions $C^3$ and $C^4$. The portion $C^3$ is connected by the hinge $C^5$ to the cross-piece C. The portion $C^4$ is connected by a hinge $C^6$ to the portion $C^3$ of the shutter.

D is a stationary portion of my printing mask. The stationary portion D comprises the arms D′ and $D^2$, the inner edges of which are suitably graduated.

$D^3$, $D^4$, $D^5$ and $D^6$ are stop projections extending upwardly from the stationary member D. The member D is secured to the top of the casing by a rivet $D^7$.

$D^8$ is a rocking shaft (see Fig. 3) journaled in bearings $D^9$, so as to extend beneath the mask member D as indicated in Fig. 3 of the drawings.

$D^{10}$ is an eccentric or cam secured to the rocking rod $D^8$.

$D^{11}$ is a lever connected to the opposite end of the rocking rod $D^8$. By throwing the lever $D^{11}$ upwardly the rod $D^8$ may be rocked to carry the major axis of the eccentric $D^{10}$ toward a vertical position bending the mask member D so as to slightly spring the inner edges of the mask member upwardly clear of the top B of the main casing.

E and E′ are the movable adjustable mask members.

$E^2$ and $E^3$ are links pivoted at one end to the movable member E and at the opposite end to the casing top B.

$E^4$ is a pointer member secured to the arm $E^3$.

$E^5$ is a graduated arc scale with which the pointer member $E^4$ coacts.

$E^6$ is an arc-shaped guide extending over the pointer member in proximity to the end thereof and provided with notches $E^7$ into which the end of the pointer member springs. The movable shutter member E′ is provided with links $E^8$ and $E^9$ and a pointer member $E^{11}$ and a coacting graduated arc scale $E^{10}$ similar to the links $E^2$ and $E^3$, pointer member $E^4$ and graduated scale $E^5$ hereinbefore described.

F is a suitable electric bulb forming an exhibiting light by which the operator may work. The bulb F is supported in the compartment $A^4$ of the main casing and F′ are a series of bulbs forming printing lights supported in the compartment $A^5$ of the main casing.

$F^2$, $F^3$, $F^4$, $F^5$ are binding posts extending through the wall $A^6$ of the supplemental casing A′.

G and G′ are contact fingers connected to the respective binding posts $F^4$ and $F^5$.

$G^2$ and $G^3$ are spring fingers connected respectively to the binding posts $F^2$ and $F^3$. The spring fingers G and G′ are provided with curved outer ends $G^4$, opposing the similar outer ends $G^5$ of the spring fingers $G^2$ and $G^3$.

$G^6$ is a vertically movable bar held in brackets $G^7$ and $G^8$. The bar $G^6$ is provided with limiting stops $G^9$ and $G^{10}$.

$G^{11}$ is an extension to the bar $G^6$, and $G^{12}$ is an insulating connection between the bar $G^6$ and the extension $G^{11}$.

$G^{15'}$ is a spring extending into the notch $G^{13}$ formed in the bar $G^6$. The tendency of the spring $G^{15'}$ is to force the bar $G^6$ upwardly.

$G^{14}$ is a contact block secured to the bar $G^6$ and designed to engage with the fingers G and G′ and the fingers $G^2$ and $G^3$ when the bar $G^6$ is moved vertically.

H is a vertical opening in the casing top B through which the extension $G^{11}$ of the bar $G^6$ extends.

H′ is a catch secured to the casing top B.

$H^2$ is an arm secured to the portion $C^4$ of the shutter $C^2$.

$H^3$ is a right angular extension formed at the outer end of the arm $H^2$.

$H^4$ is a spring pressed catch designed to engage with the catch H′.

$H^5$ is an opening (see Fig. 6) in the catch $H^4$.

$H^6$ is a pin extending from the arm $H^2$ through the opening $H^5$ whereby the movement of the catch is lmited. The catch $H^4$ is provided with a forwardly extending portion $H^7$ for a purpose which will hereinafter appear.

$G^{24}$ is a notch formed in the extension $G^{11}$ of the bar $G^6$ $G^{15}$ is a coacting catch pivoted on the bracket $G^{16}$ so as to engage with the notch $G^{24}$ when brought into the required position.

I is a leaf spring secured to the shutter member $C^4$ to one side of the arm $H^2$ and extending normally over the upper end of the bar $G^6$. It will of course be understood that the spring I is a stronger spring than the spring $G^{12}$.

2 is a wire connecting the binding posts $F^3$ and $F^5$.

3 is a wire extending from the binding post $F^5$ and connected to one terminal of each of the lamps F and F′.

4 is a wire leading from the lower terminal of the socket 4′ of the lamps F′ and is connected to the lower terminals of the other lamps F′. The opposite end of the wire 4 is connected to the binding post $F^4$.

5 is a wire leading from the binding post $F^2$ to the lower terminal of the lamp socket 5′. The circuit returns from the upper terminal of the lamp F by the common wire 3.

It will therefore be understood that when the vertical movable rod $G^6$ is in the position shown in Figs. 2 and 6 of the drawing the circuit extending from the binding posts $F^4$ and $F^5$ is closed so that all the lamps F′ are lighted. When however the rod $G^6$ is moved upwardly so that the contact piece $G^{14}$ is carried between the fingers $G^2$ and $G^3$, the circuit is closed from the binding posts $F^2$ and $F^3$ so as to light the lamp F. The previously described circuit through the lamps F′ is of course opened simultaneously.

J is a spiral spring connecting the shutter portions $C^3$ and $C^4$ together.

K is a thin transparent sheet of celluloid, which is laid over the glass B′ and over the edges of the movable mask members E and E′ (see Fig. 5).

L is a photographic film which is laid upon the celluloid K, face downward.

M is a sheet of photographic printing paper which is laid upon the top of the film. In placing the film L in position the inner edges of the mask member D are raised by the eccentric $D^{10}$. The edges of the film are then slipped beneath the edge of such member into the required position, indicated by the graduation mark on the arms D′ and $D^2$ of the member D. The printing paper is then laid over the film C, the edges thereof abutting the stops $D^3$, $D^4$, $D^5$ and $D^6$. The pointer arms $E^4$ and $E^9$ are swung to the required position indicated by the graduated scales $E^5$ and $E^{10}$ and according to the size of the picture. By moving the pointers $E^4$ and $E^9$ as above described the movable mask members are carried inwardly to the required position to cover the edge of the film and superimposed printing paper so that the required width of white margin may be left around all the edges of the photograph. The sheet of transparent celluloid prevents the edges of the movable mask members catching in the edges of the photograph when the movable members are adjusted to the required position. The shutter C′ is then swung downwardly on top of the film and paper.

It will of course be understood that while the paper and film are being adjusted the lamp F is lighted so as to throw an orange or ruby light through the transparent window $A^3$, serving to give the operator sufficient light to make the required adjustment with the shutter in the raised position. The rod $G^6$ is held in its upper position by the catch $G^{15}$ engaging the notch $G^{24}$ in this position. The contact piece $G^{14}$ is held between the spring fingers $G^2$ and $G^3$ completing the circuit through the lamp F. When the shutter is closed so as to cover the film and paper, the end $H^3$ of the arm $H^2$ engages the catch $G^{15}$ so as to release the catch from the notch $G^{24}$. The spring I which is previously brought into engagement with the upper end of the extension $G^{11}$ of the bar $G^6$ forces the bar $G^6$ downwardly, overcoming the upward pressure of the spring $G^{12}$. The rod $G^6$ is then carried downwardly to position the contact piece between the fingers G and G′, thereby breaking the circuit through the lamp F and completing the circuit through the lamp F′. The shutter is locked in its closed position by the spring catch $H^4$ engaging the catch piece H′. The photograph is then printed by means of the light from the lamps F′ and when sufficient time has elapsed the shutter is opened by pressing upon the projecting portion $H^7$ of the catch $H^4$, releasing the catch $H^4$. The shutter member C then instantly springs upward by means of the spring J thereby simultaneously releasing the bar $G^6$ from the pressure spring J and allowing the spring $G^8$ to carry the bar $G^6$ upwardly. By this means as soon as the required time for printing has elapsed the printing lights are instantaneously cut off by the opening of the shutter.

I am aware that photo printing frames have been devised in which an outer frame has been used having an opening for daylight printing, one of the sides of the opening being adjustable. In this form the printing frame is passed under the opening at any predetermined speed and the degree of exposure depends on such rate of speed and the size of the opening.

In my invention which is for printing from an artificial lamp or light, I do not wish to make any provision whereby the size of the opening may be changed in order to provide a more or less quick exposure.

My invention is particularly designed to provide a simple and efficient means whereby a margin of a determined width, that is to say, what is ordinarily termed a "white" margin may be delimited clearly on the four sides of a print of any size within certain limits depending on the machine.

What I claim as my invention is—

1. A photographic printing frame comprising a frame member provided with a light admitting panel and a mask therefor and clamping means co-acting with the mask and mounted on said frame member adjacent to said panel to engage and release a negative.

2. In a photographic printing device, a frame member having a light admitting panel and a mask therefor, and a releasable clamping means forming part of said mask and mounted on said frame member adjacent to said panel and designed to release and engage a negative.

3. A photographic printing frame, comprising a frame member provided with a light admitting panel and a mask therefor, a cover adapted to extend over the upper surface of the frame member, and clamping means forming part of said mask and mounted on said frame member adjacent to said panel to release and engage a negative independently of said cover.

4. A photographic printing frame, comprising a frame member provided with a light admitting panel and a mask therefor, a cover adapted to extend over the upper surface of the frame member, and raisable clamping means forming part of said mask and mounted on said frame member adjacent to said panel to release and engage a negative independently of said cover.

5. A photographic printing frame, comprising a frame member provided with a light admitting panel and a mask therefor, a cover adapted to extend over the upper surface of the frame member, and releasable clamping means forming part of the mask and mounted on said frame member adjacent to said panel to release and engage a negative independently of said cover.

6. A photographic printing frame, comprising a frame member provided with a light admitting panel and a mask therefor, a cover adapted to extend over the upper surface of the frame member, and releasable clamping means forming part of the mask and mounted on said frame member adjacent to said panel to release and engage a negative independently of said cover and comprising a strip of metal, and means for raising said strip upwardly.

7. A photographic printing frame, comprising a frame member provided with a light admitting panel and a mask therefor, a cover adapted to extend over the upper surface of the frame member, and releasable clamping means forming part of the mask and mounted on said frame member adjacent to said panel to release and engage a negative independently of said cover comprising a strip of metal, and a movable eccentric under said strip for raising a portion of said strip vertically.

8. A photographic printing frame, comprising a frame member provided with a light admitting panel and a mask therefor, a cover adapted to extend over the upper surface of the frame member, and releasable clamping means forming part of the mask and mounted on said frame member adjacent to said panel to release and engage a negative independently of said cover comprising a strip of metal secured to said frame against lateral movement, and a movable eccentric under said strip for raising a portion of said strip vertically.

9. In a photographic apparatus, the combination with a suitable table having a window opening and window, of a spring plate extending along two sides of the window, means located beneath the plate for springing the plate upwardly to insert a negative, adjustable members extending along the remaining sides of the window and a covering shutter extending over the window and edges of the stationary plate and movable members.

10. In a photographic printing apparatus, the combination with a suitable table having a window opening and window, of a spring plate extending along two sides of the window, a rock shaft extending beneath the stationary plate, and an operating lever secured to the opposite end of the rock shaft, as and for the purpose specified.

11. In a photographic printing apparatus, the combination with a casing having a cross partition, of printing lights located at one side of the partition, an exhibiting light located at the opposite side of the partition, a covering for the casing having a window located over the printing light, an adjustable frame extending around and over the edges of the window, an upper pair of opposing contact fingers, a lower pair of opposing contact fingers located vertically beneath the aforesaid contact fingers, a vertically movable rod held in suitable bearings, a contact piece on the rod designed to coact alternatively with the upper and lower contact fingers, means for resiliently supporting the rod in its upper position, a covering shutter extending over the window and the edges of the adjustable frame, a finger extending from the shutter designed to engage with the top of the vertically movable rod when the shutter is closed to carry the rod vertically downward and the contact piece into contact with the lower contact fingers, and suitably arranged circuits connecting the upper and lower control contact fingers respectively with the printing and exhibiting light, as and for the purpose specified.

12. In a photographic printing apparatus, the combination with a casing having a cross partition, printing lights located at one side of the partition, an exhibiting light located at the opposite side of the partition, a cover for the casing having a window located over the printing lights, an adjustable frame extending around and over the edges of the window, an upper pair of opposing contact fingers, a lower pair of opposing contact fingers located vertically beneath the aforesaid contact fingers, means for resiliently supporting the rod in its upper position, a covering shutter extending over the window and the edges of the adjustable frame, a finger extending from the shutter designed to normally engage with the top of the vertically movable rod when the shutter is closed to carry the rod vertically downward and the contact piece into contact with the lower contact fingers, and suitably arranged circuits connecting the upper and lower contact fingers respectively with the printing and exhibiting light, and means for positively locking the vertically movable rod in its upper and lower positions, as and for the purpose specified.

13. In a photographic printing apparatus, the combination with the main casing having printing and exhibiting lights located therein, a table or cover for the casing having a window opening and window located therein, an adjustable frame surrounding the window, a shutter covering the window, and means for resiliently supporting the shutter in a normally open position, of an upper and a lower pair of contact fingers, suitably arranged circuits connecting the upper and lower contact fingers respectively with the exhibiting and printing lights, a vertically movable spring held rod supported in suitable bearings, a contact piece carried by the rod to alternately engage with the upper and lower contact fingers, an insulated extension to the rod, spring fingers extending from the shutter and bearing upon the top of the insulated extension of the rod, and means for positively locking the shutter in its closed position, as and for the purpose specified.

14. In a photographic printing apparatus, the combination with the main casing having printing and exhibiting lights located therein, a table or cover for the casing having a window opening and window located therein, an adjustable frame surrounding the window, a shutter covering for the window, and means for resiliently holding the shutter in a normally open position, of an upper and lower pair of opposing contact fingers, suitably arranged circuits connecting the upper and lower contact fingers respectively with the exhibiting and printing lights, a vertical movable spring held rod supported in suitable bearings, a contact piece carried by the rod, to alternately engage with the upper and lower contact fingers, an insulated extension to the rod, a spring finger extending from the shutter and bearing upon the top of the insulated extension of the rod, a catch piece secured to the table, fingers extending from the shutter and a spring held catch carried by the finger and engaging the catch piece to hold the shutter in its closed position, as and for the purpose specified.

15. In a photographic printing apparatus, the combination with the main casing having printing and exhibiting lights located therein, a table or cover for the casing having a window opening and window located therein, an adjustable frame surrounding the window, and a shutter covering the window, and means for resiliently holding the shutter in a normally open position, of an upper and a lower pair of opposing contact fingers, suitably arranged circuits connecting the upper and lower contact fingers respectively with the exhibiting and printing lights, a vertically movable spring held rod supported in suitable bearings, a contact piece carried by the rod to alternately engage with the upper and lower contact fingers, an insulated extension to the rod, spring fingers extending from the shutter and bearing upon the top of the insulated extension of the rod, said rod having a notch therein, a finger extending from the shutter, a catch lever pivoted to the cover and engaging the notch of the lever and designed to be freed by the shutter finger engaging therewith, as and for the purpose specified.

16. In a photographic printing mask, the combination with a suitable flat support having a window therein designed to support a negative and printing paper, of an adjustable frame designed to hold the negative in a definite position on the window and the paper in a definite position in relation to the negative, a sheet of flexible transparent substance over the window and the edges of the adjustable portions of the frame, to prevent the edges of the frame engaging the edges of the negative and paper, and a covering shutter designed to extend over the top of the paper, negative and frame, as and for the purpose specified.

17. In a photographic printing machine, the combination with the main printing support or frame, having a window opening, of a right angular plate extending along two sides of the opening and above the same and overhanging the two adjacent edges of the window opening, and two independently adjustable, lateral plates located one above each of the other sides of the window opening, as and for the purpose specified.

18. The combination with the frame having a window opening therein and the source of light derived from the back of such opening, and a light admitting plate suitably held in the opening and designed to receive the film thereupon, of a stationary protruding edge plate, and laterally adjustable protruding edge plates co-acting therewith against the inside of which the marginal edge face of the film abuts and upon which plates the sensitized paper is placed with the sensitized face toward the plates whereby the marginal edge of the sensitized paper is protected from exposure, as and for the purpose specified.

19. The combination with a frame having a window opening therein and the source of light derived from the back of such opening and a light-admitting plate suitably held in the opening and designed to receive the film thereupon, of a stationary protruding right angular edge plate extending around two sides of the opening and laterally adjustable protruding edge plates co-acting therewith against the inside of which the marginal edge face of the film abuts and upon which plates the printing paper is placed with the sensitive face toward the plates whereby the marginal edge of the sensitized paper is protected from exposure, as and for the purpose specified.

20. In a photo printing frame, a stationary protruding edge plate and adjustable protruding edge plates co-acting therewith, all designed to be located around the window opening and so arranged in relation to the film and the superimposed sensitized paper as to form a marginal obstruction to the light passing through the film on to the sensitized paper, as and for the purpose specified.

21. In a photo printing frame, a protruding edge plate stationary as to any lateral movement in relation to the opening and raisable and protruding adjustable edge plates co-acting therewith, all designed to be located around the window opening and so arranged in relation to the film and the superimposed sensitized paper as to form a marginal obstruction to the light passing through the film on to the sensitized paper, as and for the purpose specified.

22. In a photographic printing mask, the combination with a suitable flat support having a window therein designed to support a negative and printing paper, of an adjustable frame designed to hold the negative in a definite position on the window and the paper in a definite position in relation to the negative, and a covering shutter designed to extend over the top of the paper, negative and frame, as and for the purpose specified.

23. In a photographic printing device, the combination with a support or frame having a printing opening, and a light admitting support for the negative located therein, of an auxiliary adjustable frame comprising a right angular plate stationary as to any lateral movement, and projecti two adjacent edges of the opening, laterally adjustable plates located over the remaining edges of the opening, such auxiliary frame being made of thin non-actinic material and so placed in relation to the opening as to come into close contact with the film and the paper to produce a white margin upon the edges of a finished photographic print, as and for the purpose specified.

24. In a photographic printing device, the combination with a support or frame having a printing opening and a light admitting support for the negative located therein, of an auxiliary adjustable frame comprising a right angular plate stationary as to any lateral movement, raisable to permit the film being placed beneath its edges, and projecting over the two adjacent edges of the opening, laterally adjustable plates located over the remaining sides of the opening, such auxiliary frame being made of some non-actinic material and so placed in relation to the opening as to come into close contact with the film and the paper to produce a white margin upon the edges of a finished photographic print, as and for the purpose specified.

25. In a photographic printing device, the combination with a support or frame having a printing opening, and a light admitting support for the negative located therein, of an auxiliary adjustable frame portion comprising a right angular plate stationary as to any lateral movement, and projecting over the two adjacent sides of the opening, and stop plates or butts located on top of the plate and in from the edges thereof, against which the printing paper is designed to abut to determine its position, as and for the purpose specified.

26. In a photographic printing device, the combination with a suitable support or frame and a light admitting support for the negative located therein, of a right angular plate, stationary as to any lateral movement, raisable to permit of placing the negative beneath its edges and projecting over the two adjacent edges of the opening, and being so placed as to come between the negative and printing paper whereby a definite white margin is insured upon the two adjacent edges of the paper, as and for the purpose specified.

27. In a photographic printing device, the combination with a suitable support or frame and a light admitting support for the negative supported therein, of a right angular plate stationary as to any lateral movement and projecting over the two adjacent edges of the opening, being so placed as to come between the negative and printing paper insuring a definite white margin upon the two adjacent edges of the paper, as and for the purpose specified.

28. In a photographic printing device, the combination with a support or frame having a printing opening and a light admitting support for the negative located therein, of an auxiliary adjustable frame made of thin non-actinic material extending around and projecting over the edges of the printing opening, one part of the auxiliary frame being raisable to permit of placing the edge of the negative beneath it, and the other parts, on the remaining sides of the opening each being independently adjustable beneath the negative to the size of the picture to be printed, and all placed in such a manner as to form a printing mask and insure a white margin around the edges of the paper while printing, as and for the purpose specified.

29. In a photographic printing device, the combination with a support or frame having a printing opening, and a light admitting support for the negative, of an auxiliary adjustable frame made of thin non-actinic material extending around and projecting over the edges of the printing opening, one part of the auxiliary frame being raisable to permit of the edges of the negative being inserted beneath it, and having a normal tendency to spring downwardly against the negative to hold it in the position in which it is placed, the other parts of the frame on the remaining sides of the opening being adjustable beneath the negative to the size of the picture to be printed, and all placed in such a manner as to form a printing mask and insure a white margin around the edges of the paper while printing, as specified.

30. In a photographic printing device a right angular masking portion and two-co-acting adjustable masking portions, such right angular portion having degree marks thereupon to show the size to which the printing opening is adjusted, as specified.

31. In a photographic printing device, a right angular masking portion designed to cover two edges of the opening, raisable upwardly, and having a normal tendency to spring downwardly, as specified.

ANDREW HARMON WALLACE.

Witnesses:

B. Boyd,

E. Pennock.